(12) United States Patent
Yamaguchi

(10) Patent No.: US 7,987,582 B2
(45) Date of Patent: Aug. 2, 2011

(54) METHOD OF MANUFACTURING A HEAD GIMBAL ASSEMBLY

(75) Inventor: Satoshi Yamaguchi, Shatin (HK)

(73) Assignee: SAE Magnetic (H.K.) Ltd., Shatin, N.T. (HK)

( * ) Notice: Subject to any disclaimer, the term of this patent is extended or adjusted under 35 U.S.C. 154(b) by 296 days.

(21) Appl. No.: 11/344,849

(22) Filed: Jan. 31, 2006

(65) Prior Publication Data

US 2006/0171080 A1 Aug. 3, 2006

(30) Foreign Application Priority Data

Jan. 31, 2005 (JP) ................... 2005-024409

(51) Int. Cl.
*G11B 5/48* (2006.01)
*B32B 7/12* (2006.01)

(52) U.S. Cl. .............. 29/603.06; 29/603.04; 29/841; 156/230; 360/234.5; 360/234.6; 360/245.8

(58) Field of Classification Search .............. 29/603.04, 29/603.05, 603.06, 841; 156/325, 327, 230; 360/234.5, 245.8, 294.1, 294.4, 294.3, 234.6
See application file for complete search history.

(56) References Cited

U.S. PATENT DOCUMENTS

| | | | | |
|---|---|---|---|---|
| 3,526,607 A * | 9/1970 | Brown et al. | ............. | 156/330 X |
| 4,715,919 A * | 12/1987 | Fakirov et al. | ............. | 156/325 X |
| 6,621,661 B1 * | 9/2003 | Ichikawa et al. | ........... | 360/234.5 |
| 6,700,749 B2 | 3/2004 | Shiraishi et al. | | |
| 6,751,069 B2 * | 6/2004 | Yao et al. | ................... | 360/294.4 |
| 6,927,945 B2 * | 8/2005 | Yao et al. | ................... | 360/294.3 |
| 7,239,484 B2 | 7/2007 | Yamaguchi | | |
| 2003/0147181 A1 * | 8/2003 | Shiraishi et al. | ........... | 360/294.4 |
| 2004/0001288 A1 * | 1/2004 | Yao et al. | ................... | 360/294.3 |

FOREIGN PATENT DOCUMENTS

| | | |
|---|---|---|
| JP | 59-125754 | 8/1984 |
| JP | 2001332041 A * | 11/2001 |
| JP | 2002-133803 | 5/2002 |
| JP | 2002-150734 | 5/2002 |
| JP | 2004-158163 | 6/2004 |
| JP | 2004-283911 | 10/2004 |

* cited by examiner

*Primary Examiner* — A. Dexter Tugbang
(74) *Attorney, Agent, or Firm* — Jordan and Hamburg LLP

(57) ABSTRACT

A micro-actuator to which no head slider is adhesively bonded is mounted on a suspension. The head slider is adhesively bonded to the micro-actuator mounted on the suspension. Before the head slider adheres to the micro-actuator, an electrical connecting work of the slider is completed, and a characteristic test is carried out. If the head slider is judged as being normal as a result of the characteristic test, the head slider concerned is bonded to the micro-actuator by the adhesive.

2 Claims, 12 Drawing Sheets

METHOD OF MANUFACTURING A HEAD GIMBAL ASSEMBLY

BACKGROUND OF THE INVENTION

1. Field of the Invention

The present invention relates to a head gimbal assembly (HGA) including a head slider having a magnetic head element, a micro-actuator for minutely driving (fine positioning) the head element and a suspension on which the head slider and the micro-actuator are mounted, a magnetic disc drive device equipped with the head gimbal assembly and a method of manufacturing the head gimbal assembly.

2. Description of the Related Art

A disc drive device is designed so that recording/reproduction of information is carried out on a disc by a magnetic head formed on a head slider. The head slider is mounted on a support member called as a suspension, and it is moved so as to face the magnetic disc while following the driving of the suspension by a voice coil motor (hereinafter referred to as "VCM").

In connection with large-capacity and high-density recording design for magnetic disc devices, increase of the density in the disc radial direction (track width direction) has been recently promoted, and thus it has been hitherto difficult to perform the accurate positioning of the magnetic head by merely controlling the voice coil motor (VCM).

Therefore, a technique using a driving mechanism called as a micro-actuator has been proposed as one method of implementing the precise positioning of the magnetic head. According to this technique, in addition to VCM, an actuator mechanism is mounted to be nearer to a magnetic head slider side than VCM, and minute and precise positioning which cannot be implemented by VCM is carried out by the micro-actuator. The micro-actuator is disclosed in JP-A-2004-158163, for example.

A fabrication process for a head gimbal assembly having this type of micro-actuator mounted therein has been hitherto carried out in the following order.

First, a head slider is disposed between the arms of a micro-actuator, and each arm and the header slider are bonded to each other by an adhesive. Thereafter, the micro-actuator to which the head slider adheres is mounted on a suspension, and then a necessary electrical connecting work is carried out on the micro-actuator and the head slider.

In the above-described fabrication order, however, the head slider must be handled in many steps, and thus the magnetic head formed on the head slider may be damaged by electrostatic discharge (ESD) or the like with high probability, which causes reduction in yield.

Furthermore, the handling of the head slider is required to be carried out in a high-precision clean room in order to prevent adherence of dust or moisture to the magnetic head. In the conventional manufacturing process, the head slider is first adhesively bonded to the micro-actuator, and thus the manufacturing steps must be carried out in a high-precision clean room after the first step of adhesively bonding the head slider to the micro-actuator. Therefore, a high equipment investment has been hitherto required to provide a clean room.

Still furthermore, when the head slider is defective, it is required to detach the micro-actuator from the suspension, remove the head slider from the micro-actuator thus detached and then re-fabricating these elements, and thus rework is cumbersome. In addition, the same work is required to withdraw defective head sliders, and thus the withdrawing work is also cumbersome as in the case of the rework.

SUMMARY OF THE INVENTION

The present invention has been implemented in view of the foregoing situation, and has an object to provide a method of manufacturing a head gimbal assembly with which a breakage rate of a head slider in the manufacturing process can be reduced to thereby boost the yield, the equipment investment can be suppressed and also a rework and a withdrawing work of defective head sliders can be easily performed.

Furthermore, the present invention has an object to provide a head gimbal assembly suitable for the manufacturing method, and has an object to provide a magnetic disc drive device in which the head gimbal assembly is installed.

In order to attain the above objects, according to a first aspect of the present invention, a method of manufacturing a head gimbal assembly including a head slider having a magnetic head element, a micro-actuator for minutely driving the head element, the head slider being adhesively bonded to the micro-actuator, and a suspension on which the head slider and the micro-actuator are mounted, comprises the steps of:

mounting a micro-actuator on a suspension while no head slider is adhesively bonded to the micro-actuator; and adhesively bonding a head slider to the micro-actuator mounted on the suspension.

According to the first aspect of the present invention, the micro-actuator is first mounted on the suspension under the state that the head slider is not adhesively bonded to the micro-actuator, and thus a step in which handling of the head slider is required can be eliminated. Accordingly, breakage of the magnetic head by electrostatic discharge) or the like can be suppressed, and also high-precision clean room can be eliminated. Furthermore, the rework or the withdrawing work needed when the head slider is a defective product can be carried out while the micro-actuator is mounted on the suspension, and thus the number of the working steps thereof can be reduced and thus these works can be easily performed.

Here, it is preferable in the head slider adhesively bonding step that at least a part of the head slider and at least tip portion of the arm of the micro-actuator are adhesively bonded to each other while covered with the adhesive. The adhesion can be implemented by resin adhesion based on potting, for example.

By adopting the above-described adhering method, the header slider can be easily adhesively bonded to the micro-actuator mounted on the suspension.

A fixed gap (interval) is formed between the arm of the micro-actuator and the head slider to keep a minute moving space of the head slider. There has been hitherto adopted a method of pouring the adhesive into a part of the gap and adhesively attach the head slider. In this method, in connection with miniaturization of the micro-actuator and the head slider, the dimension of the gap is more minute. Therefore, it is difficult to pour the adhesive into the gap, and a trouble such as adhesion failure or the like is liable to occur.

On the other hand, according to the invention using he above adhering method, even when the gap between the head slider and the micro-actuator is minute in dimension, these members can be surely adhesively bonded to each other, thereby suppressing occurrence of defective products due to adhesion failure.

Furthermore, when the head slider electrical connection step of electrically connecting the head slider is carried out before the head slider adhesively bonding step, a characteristic test can be carried out on the head slider before the adhesively bonding step. Therefore, a head slider which is judge as a defective product by the characteristic test can be more easily removed and withdrawn.

A head gimbal assembly of the present invention comprises a head slider having a magnetic head element, a micro-actuator having an arm for minutely driving the head element and a suspension on which the head slider and the micro-actuator are mounted, wherein the head slider and the arm of the micro-actuator are bonded to each other by the adhesive under the state that the surface of the tip edge portion of at least one of the head slider and the micro-actuator are covered by the adhesive.

As described above, by adhesively bonding the head slider and the micro-actuator at the surface portions thereof, whereby these members can be easily adhesively bonded to each other irrespective of the gap dimension between the arm of the micro-actuator and the head slider, and thus the head gimbal assembly can be easily miniaturized.

The resin formation style of the surfaces of the above members can be implemented by resin adhesion based on potting.

Furthermore, in the above-described head gimbal assembly, the suspension may be constructed by a flexure to which the micro-actuator is adhesively bonded, and a moving plate which is supported independently of the flexure and on which an electrical connecting portion of the head slider is formed. In this case, the resin adhesive agent through which the head slider and the arm of the micro-actuator adhere to each other may be expanded to the moving plate so that the moving plate is also adhesively bonded.

By adhesively bonding the moving plate in conjunction with the head slider and the arm of the micro-actuator, the rigidity between the moving plate and the head slider is enhanced, so that the electrical connecting portion of the moving plate can follow the minute movement of the head slider, and the concentration of stress to the electrical connecting portion can be reduced.

Furthermore, when the resin adhesive agent through which the head slider and the micro-actuator adhere to each other is further expanded to the electrical connecting portion of the head slider formed on the moving plate so that the electrical connecting portion is covered by the resin adhesive agent, the rigidity between the micro-actuator and the electrical connecting portion is enhanced, so that the concentration of stress to the electrical connecting portion can be further reduced, and also the electrical connecting portion can be protected by the resin adhesive agent, thereby preventing deterioration of electrical connecting portion

DETAILED DESCRIPTION OF THE PREFERRED EMBODIMENTS

A preferred embodiment according to the present invention will be described hereunder with reference to the accompanying drawings.

[Disc Drive Device]

Figure 1:
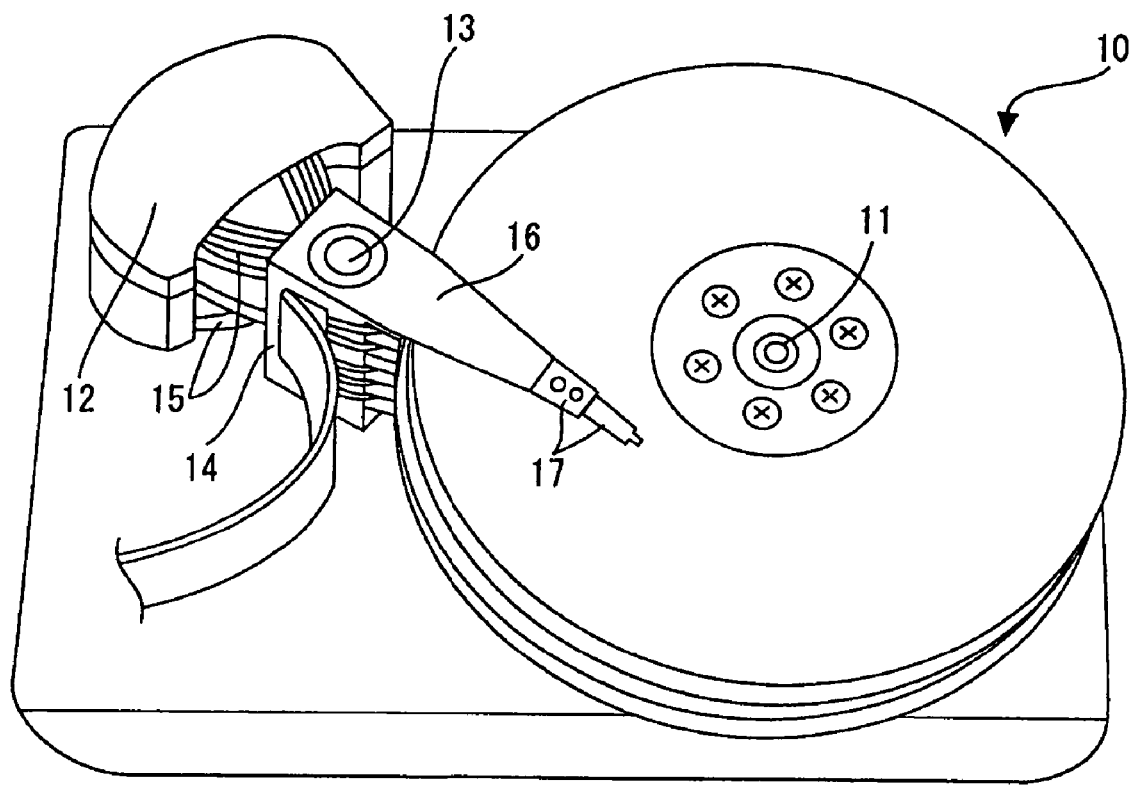
FIG. 1 is a perspective view showing a disc device according to an embodiment of the present invention.

FIG. 1 is a perspective view showing a disc drive device according to an embodiment of the present invention.

In FIG. 1, reference numeral 10 represents plural magnetic discs rotating around a shaft 11, and reference numeral 12 represents a VCM housing in which a voice coil motor (VCM) for positioning a magnetic head slider on a track is accommodated. The VCM housing 12 is provided with a carriage 14 which is angularly swung around a shaft 13, a main actuator 15 comprising VCM for angularly swinging the carriage 14, etc.

The base portions of plural driving arms 16 stacked in the direction along the shaft 13 are secured to the carriage 14, and a head gimbal assembly (HGA) is fixed to the tip portion of each driving arm 16. Each HGA 17 is provided to the tip portion of the driving arm 16 so that the magnetic head slider provided to the tip portion of HGA 17 faces the surface of each magnetic disc 10.

[Head Gimbal Assembly]

Figure 2:
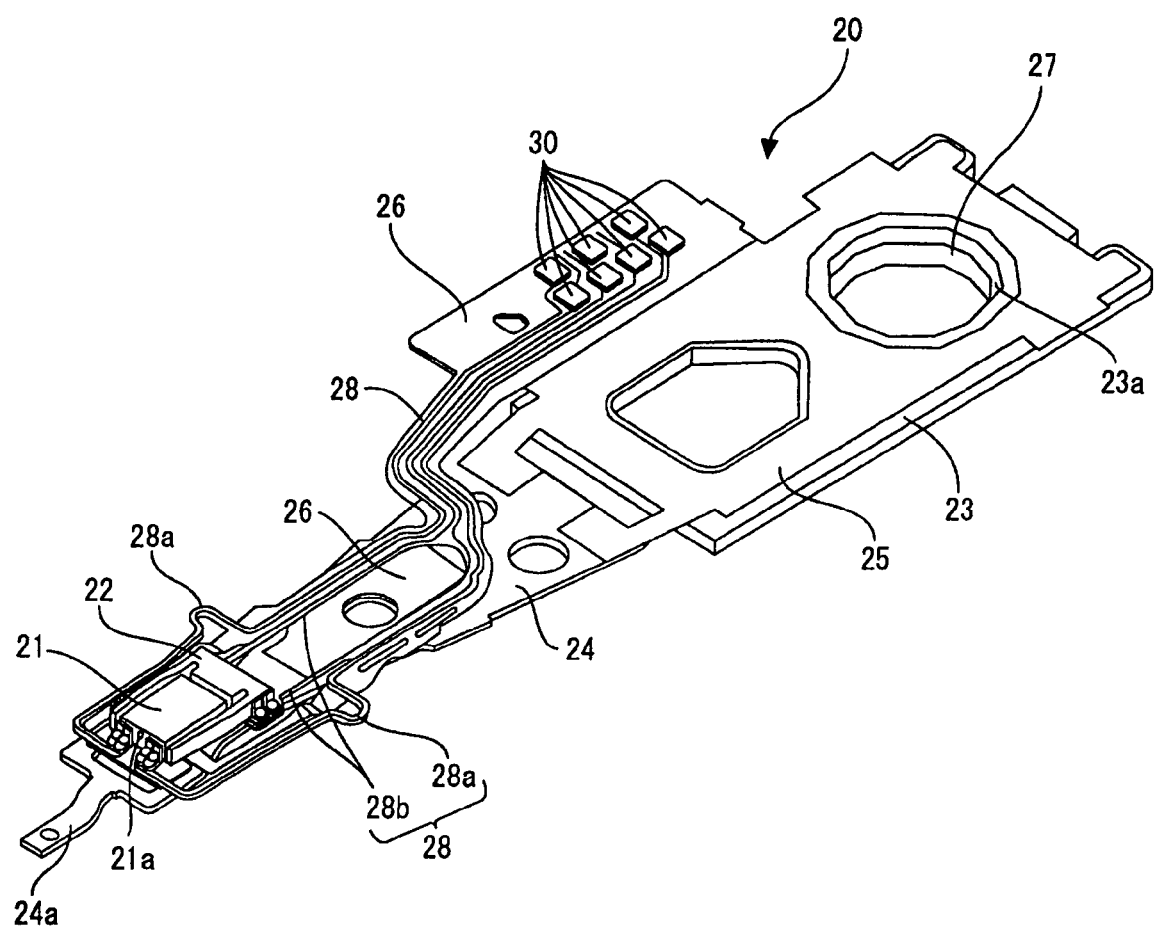
FIG. 2 is a perspective view showing the overall structure of a head gimbal assembly according to the embodiment of the present invention.
Figure 3:
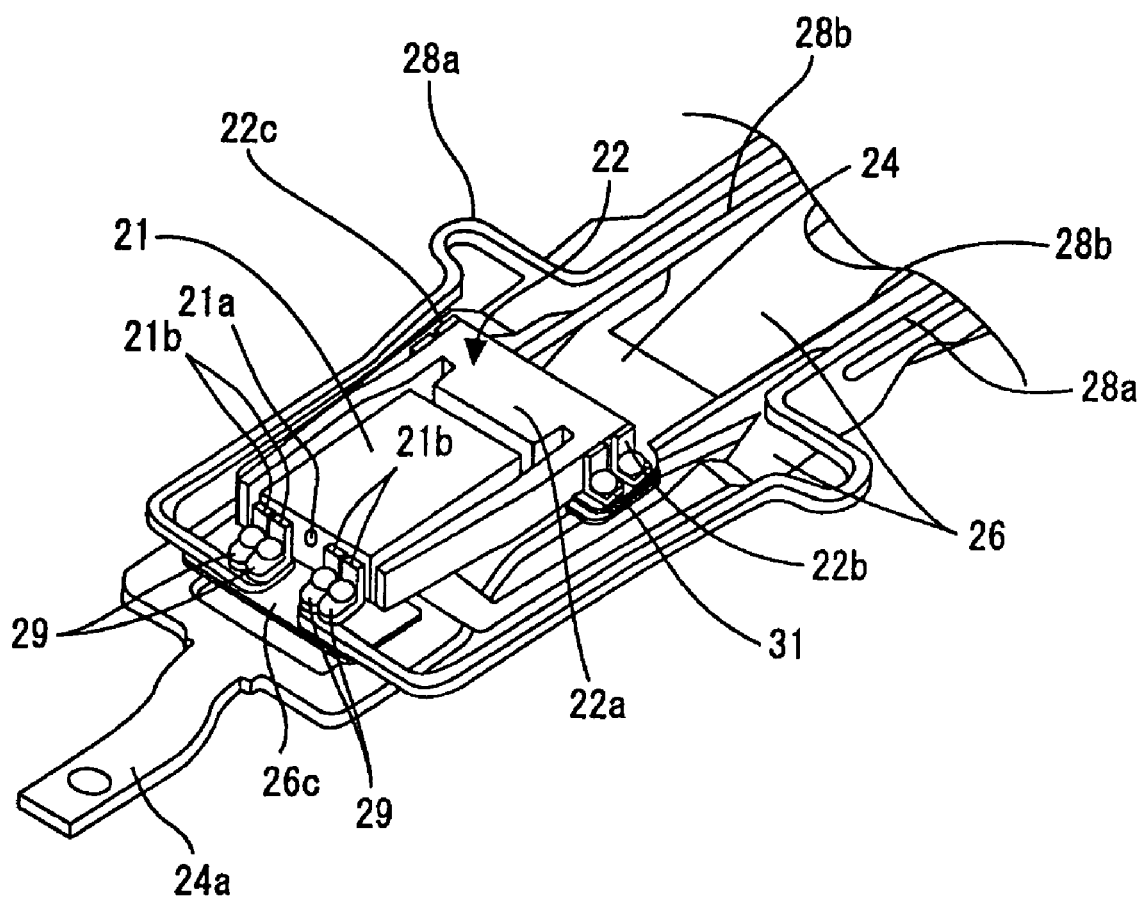
FIG. 3 is an enlarged perspective view showing the head gimbal assembly.
Figure 4:
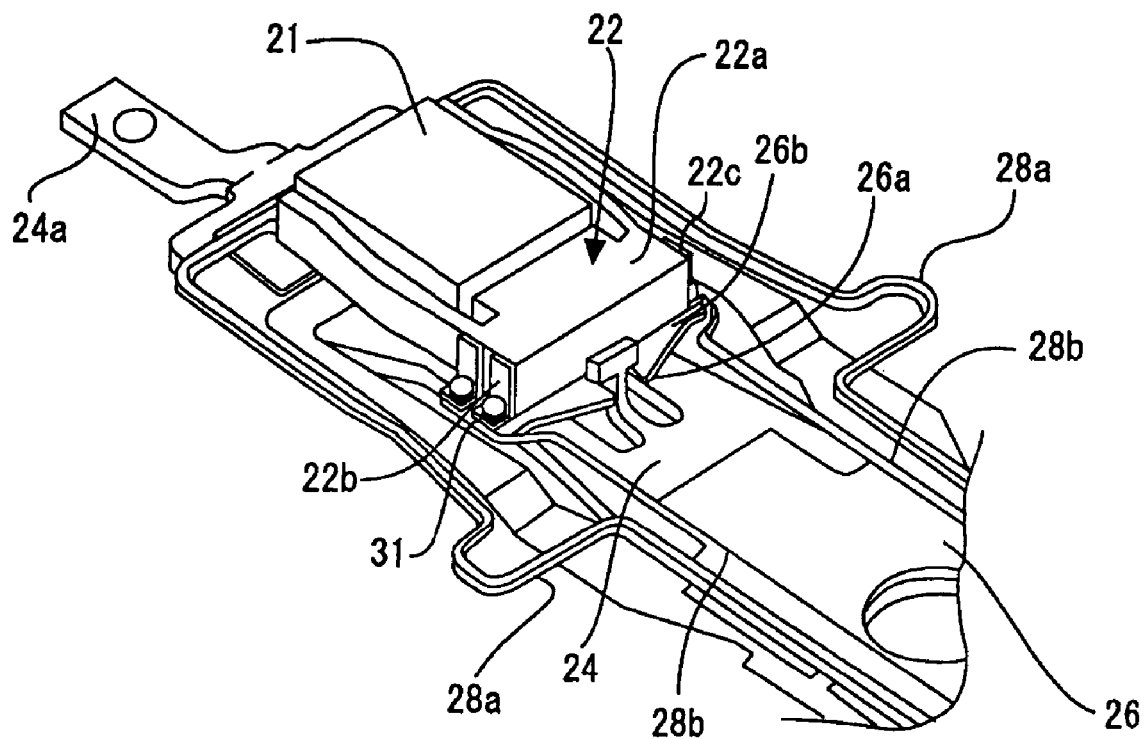
FIG. 4 is an enlarged perspective view showing the tip portion of the had gimbal assembly which is viewed from a different direction.

FIG. 2 is a perspective view showing the overall structure of the head gimbal assembly according to the embodiment, and FIGS. 3 and 4 are perspective views showing the tip portion of the head gimbal assembly which are viewed from different sides.

As shown in FIGS. 2 to 4, the side surfaces of the head slider 21 having the magnetic head element 21a thereon are pinched by the micro-actuator 22 for precisely positioning the magnetic head element 21a and the micro-actuator 22 is fixed to the tip portion of the suspension 20.

The main actuator 15 shown in FIG. 1 is provided to move the whole of the HGA 17 by displacing the driving arm 16 equipped with HGA 17, and the micro-actuator 22 is provided so as to enable a minute displacement which cannot be implemented by the main actuator 15.

The micro-actuator of this embodiment is designed so that the head slider 21 is pinched by the micro-actuator. However, the micro-actuator of the present invention is not limited to this type, and another type actuator may be used.

The suspension 20 includes a base plate 23, a load beam 24, a hinge 25 that has elasticity and connects the base plate 23 to the load beam 24, a flexure 26 that has elasticity and is fixed on the load beam 24 and the hinge 25, a circular base plate 27 provided to a fixing portion 23a of the base plate 23, and a trace pattern 28.

The flexure 26 has a soft tongue portion 26a at one end portion thereof, and the tongue portion 26a is pressed by a dimple (not shown) provided to the base plate 23. The base portion 22a of the micro-actuator 22 is fixed onto the tongue portion 26a through an insulating layer 26b of polyimide or the like. The flexure 26 has such elasticity that the head slider 21 is flexibly supported by the tongue portion 26a through the micro-actuator 22. The fixing between the flexure 26 and each of the load beam 24 and the hinge 25 is carried out at plural places by pinpoint welding.

The hinge 25 has elasticity so that the force of pressing the head slider 21 to the magnetic disc side is applied to the load beam 24.

The base plate 23 supports the hinge 25 over the whole surface thereof. The fixing between the load beam 24 and the hinge 25 is carried out at plural places by pinpoint welding. A lift tub 24a is provided to the tip of the load beam 24 so that HGA is separated from the surface of the magnetic disc under the non-operation state.

The circular base plate 27 is fixed to the fixing portion 23a formed at the base portion of the base plate 23 by welding. The circular base plate 27 is secured to the driving arm 16 (see FIG. 1).

A flexible trace pattern 28 having plural trace patterns based on a laminate thin film pattern is formed or mounted on the flexure 26. The trace pattern 28 is formed by the well-known patterning method as used when a print board is formed on a metal thin plate like a flexible print circuit (FPC).

In the embodiment shown in the figures, the trace pattern 28 comprises a first trace pattern 28a containing lead conductors connected to the magnetic head element, and a second trace pattern 28b containing lead conductors connected to the micro-actuator 22.

At the tip portion of the flexure 26, one ends of the lead conductors of the first trace pattern 28a are connected to connection pads 29 (electrical connecting portions) for the magnetic head that are separated from the flexure 26 and provided on the freely-movable moving plate 26c. The connecting pads 29 are connected to terminal electrodes 21b of the head slider 21 by GBB (Gold Ball Bonding), SBB (Solder Ball Bonding), or the like. The other ends of the lead conductors of the first trace pattern 28a are connected to external circuit connecting pads 30 to be connected to external circuits.

One ends of the lead conductors of the second trace pattern 28b are connected to actuator connecting pads 31 formed on the insulating layer 26b of the tongue portion 26a of the flexure 26, and the connecting pads 31 are connected to A-channel and B-channel signal terminal electrodes 22b, 22c provided to the base portion 22a of the micro-actuator 22. The other ends of the lead conductors of the second trace pattern 28b are connected to external circuit connecting pads 30 to be connected to external circuits.

It is apparent that the structure of the suspension in HGA of the present invention is not limited to the above-described structure. As not shown, a head driving IC chip may be mounted at some position of the suspension 20.

Figure 5:
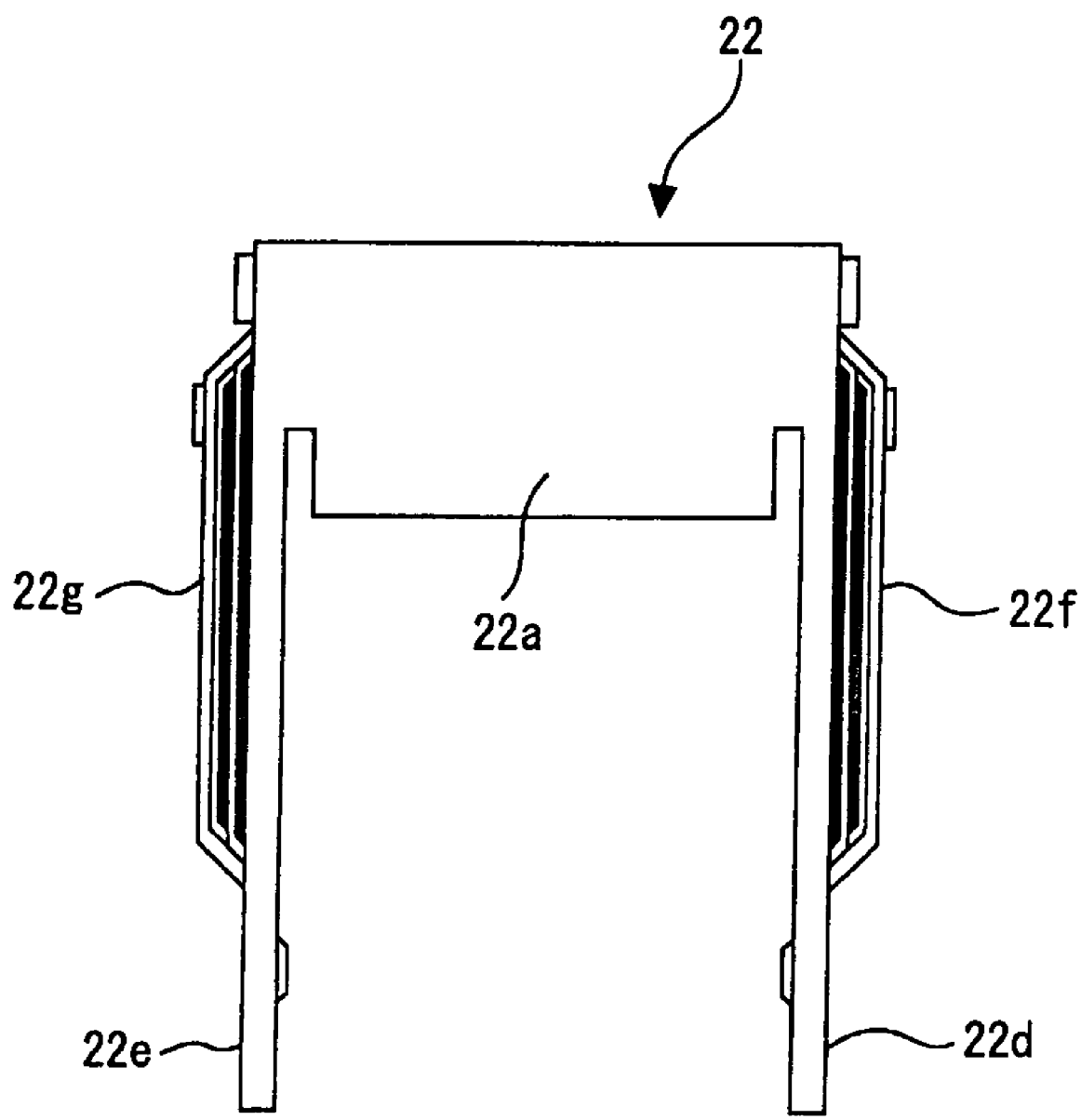
FIG. 5 is a plan view showing the structure of a micro-actuator according to the embodiment.
Figure 6A:
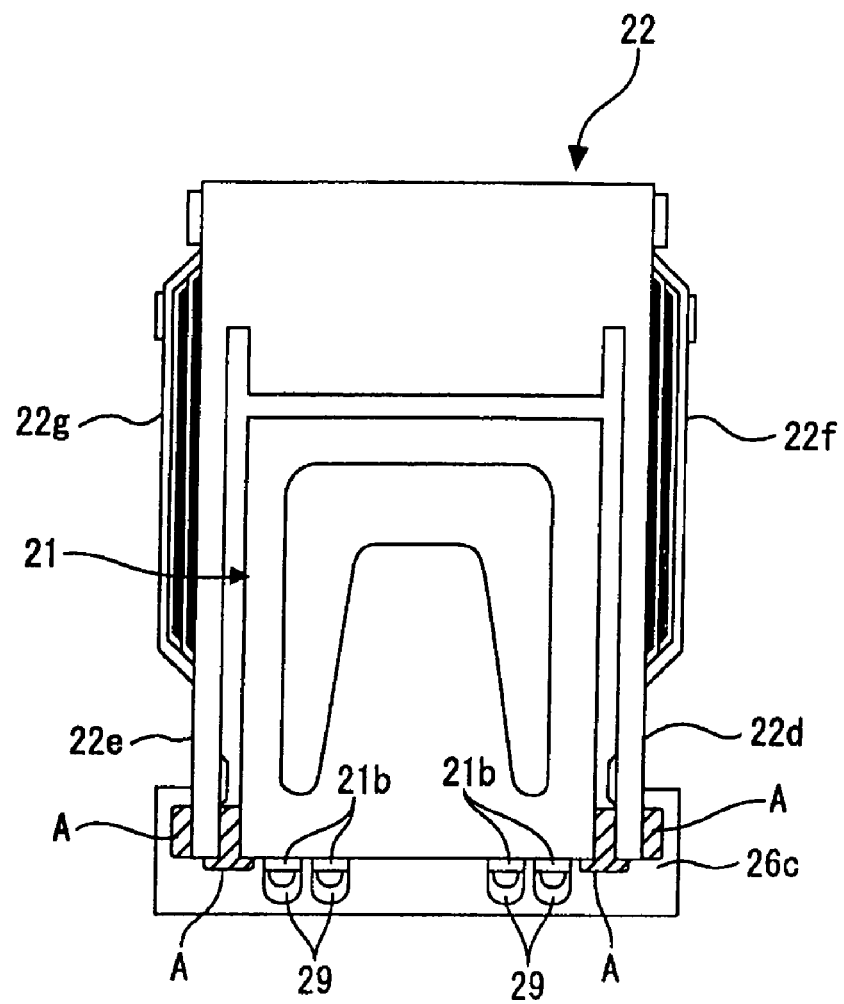
FIG. 6A is a plan view showing an adhesion structure between the micro-actuator and the head slider.
Figure 6B:
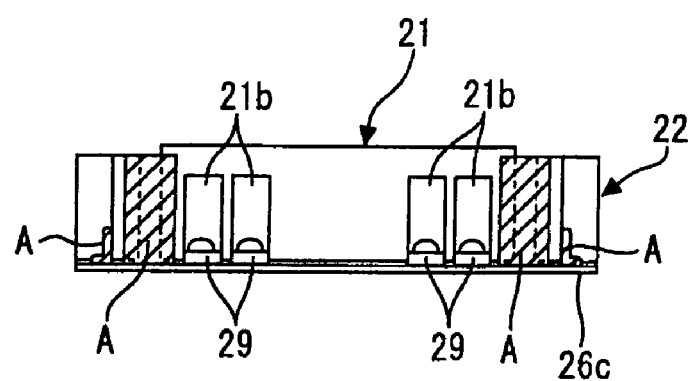
FIG. 6B is a front view of the adhesion structure shown in FIG. 6A.

FIG. 5 is a plan view showing the structure of the micro-actuator of this embodiment, FIG. 6A is a plan view showing the adhesion structure between the actuator and the head slider, and FIG. 6B is a front view of FIG. 6B.

As shown in these figures, the micro-actuator is designed to be substantially U-shaped in plan view, and a pair of movable arm portions (merely referred to as "arm") 22d, 22e extend substantially vertically from both the ends of the base portion 22a fixed to the suspension. Piezoelectric elements 22f, 22g comprising so-called piezoelectric material of PZT or the like are provided to the outer side surfaces of the movable arm portions 22d, 22e.

The head slider 21 is sandwiched between the movable arm portions 22d, 22e, and the tip edge portion of the head slider 21 is adhesively bonded to the tip edge portions of the movable arm portions 22d, 22e by the adhesive A of epoxy resin or the like as shown in FIGS. 6A and 6B.

Here, the adhesion between the movable arm portions 22d, 22e of the micro-actuator 22 and the head slider 21 is carried out by using the adhering method called as potting. The potting is a technique of attaching adhesive A to an adhesion target place by dropping, coating or spraying the adhesive A from the external. In this embodiment, the adhesion is carried out by using the potting, whereby each of the movable arm portions 22d, 22e of the micro-actuator 22 and the head slider 21 can be easily firmly adhesively bonded to each other.

As shown in FIGS. 6A and 6B, the adhesive A is coated on the area extending from the tip edge portion of each of the movable arm portions 22d, 22e and the head slider 21 to a part of the tip surface thereof so as to cover the surface thereof.

Attention must be paid so that the adhesive is not protruded from the float surface (the upper surface of FIG. 6B) of the head slider 21. When the adhesive is unintentionally protruded from the float surface of the head slider 21, it comes into contact with the magnetic disc 10 (see FIG. 1) and damages the surface of the magnetic disc 10 concerned.

Furthermore, the adhesive A is also coated so as to expand to the moving plate 26c provided below the tip portions of the movable arm portions 22d, 22e and the head slider 21, whereby the movable arm portions 22d, 22e, the head slider 21 and the moving plate 26c are made to integrally adhere to one another. Therefore, the rigidity between the head slider 21 and the moving plate 26c is enhanced, and thus the magnetic head element connecting pads 29 (electrical connecting portions) of the moving plate 26c can follow the minute movement of the head slider 21, so that the concentration of stress onto the magnetic head element connecting pads 29 can be reduced.

Figure 7A:
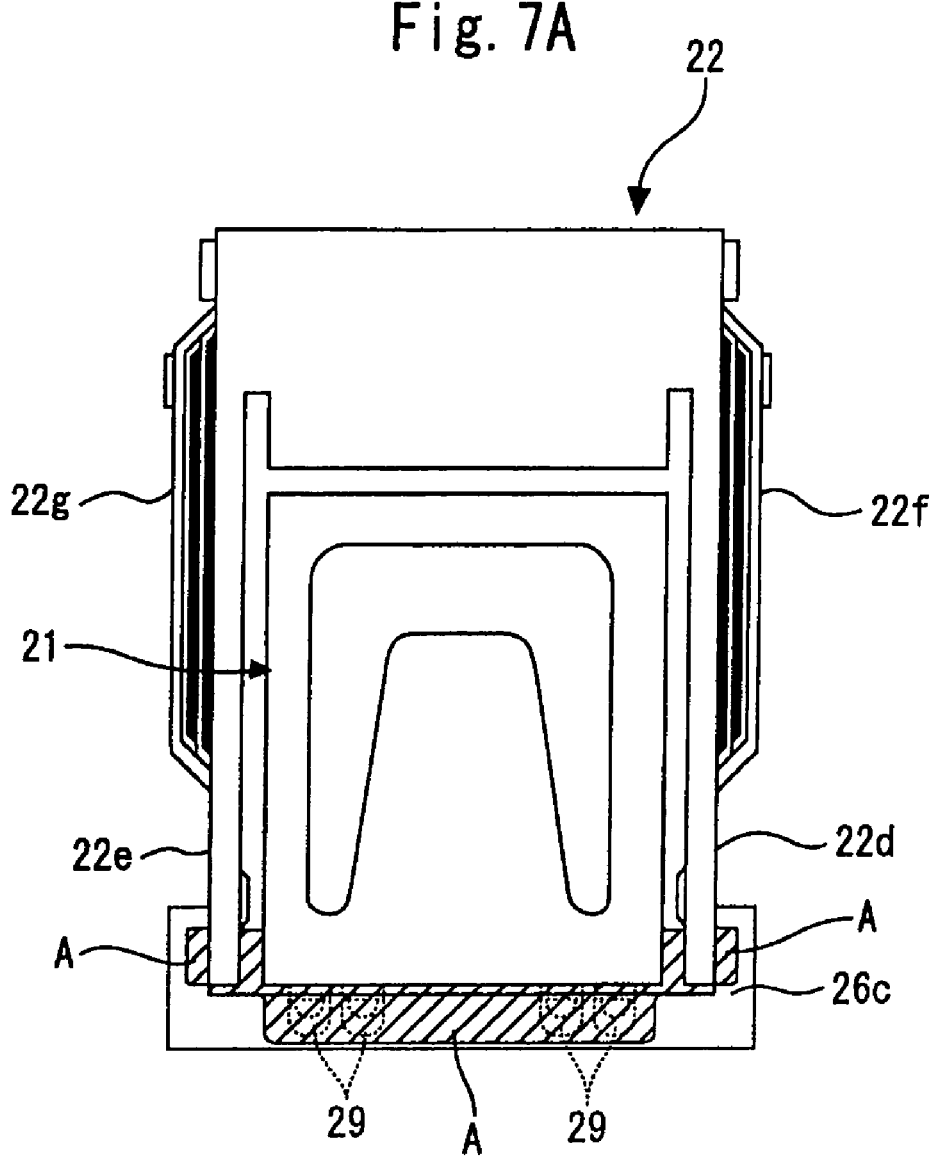
FIG. 7A is a plan view showing another adhesion structure between the micro-actuator and the head slider.
Figure 7B:
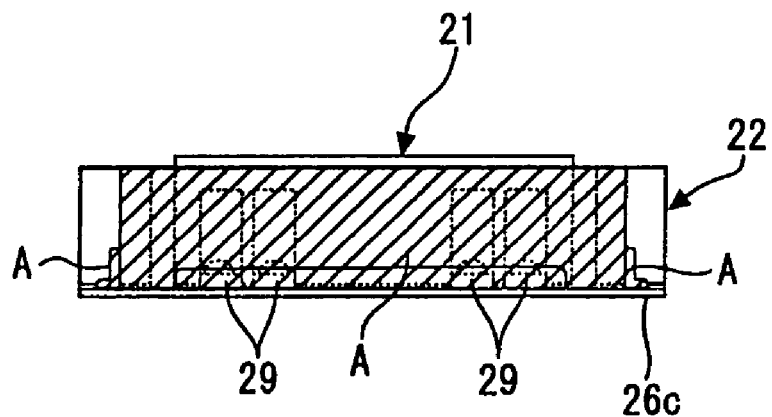
FIG. 7B is a plan view showing the adhesion structure shown in FIG. 7A.

FIG. 7A is a plan view showing another adhesion structure between the micro-actuator and the head slider, and FIG. 7B is a front view.

As shown in FIGS. 7A and 7B, the adhesive A for adhesively bonding the head slider 21 to the movable arm portions 22d, 22e of the micro-actuator 22 may be expanded so as to be coated on the substantially whole area of the tip surface of each of these elements, and also coated on the magnetic head element connecting pads 29 of the head slider formed on the moving plate 26c.

According to the adhesion structure described above, the rigidity between the moving plate 26c and the micro-actuator 22 is enhanced, and the stress concentration onto the electrical connecting portion can be further reduced. In addition, the magnetic head element connecting pad 29 is protected by the adhesive A, thereby preventing the deterioration of electrical connecting portion.

When a voltage for inducing contraction or expansion is applied to the piezoelectric elements 22f, 22g, each piezoelectric element portion contracts or expands in each case, whereby each of the movable arm portions 22d, 22e sags in S-shape, and the tip portion thereof is laterally swung. As a result, the head slider 21 is likewise swung laterally.

[Manufacturing Method of Head Gimbal Assembly]

Next, a method of manufacturing the head gimbal assembly according to the embodiment of the present invention will be described with reference to the accompanying drawings.

Figure 8:
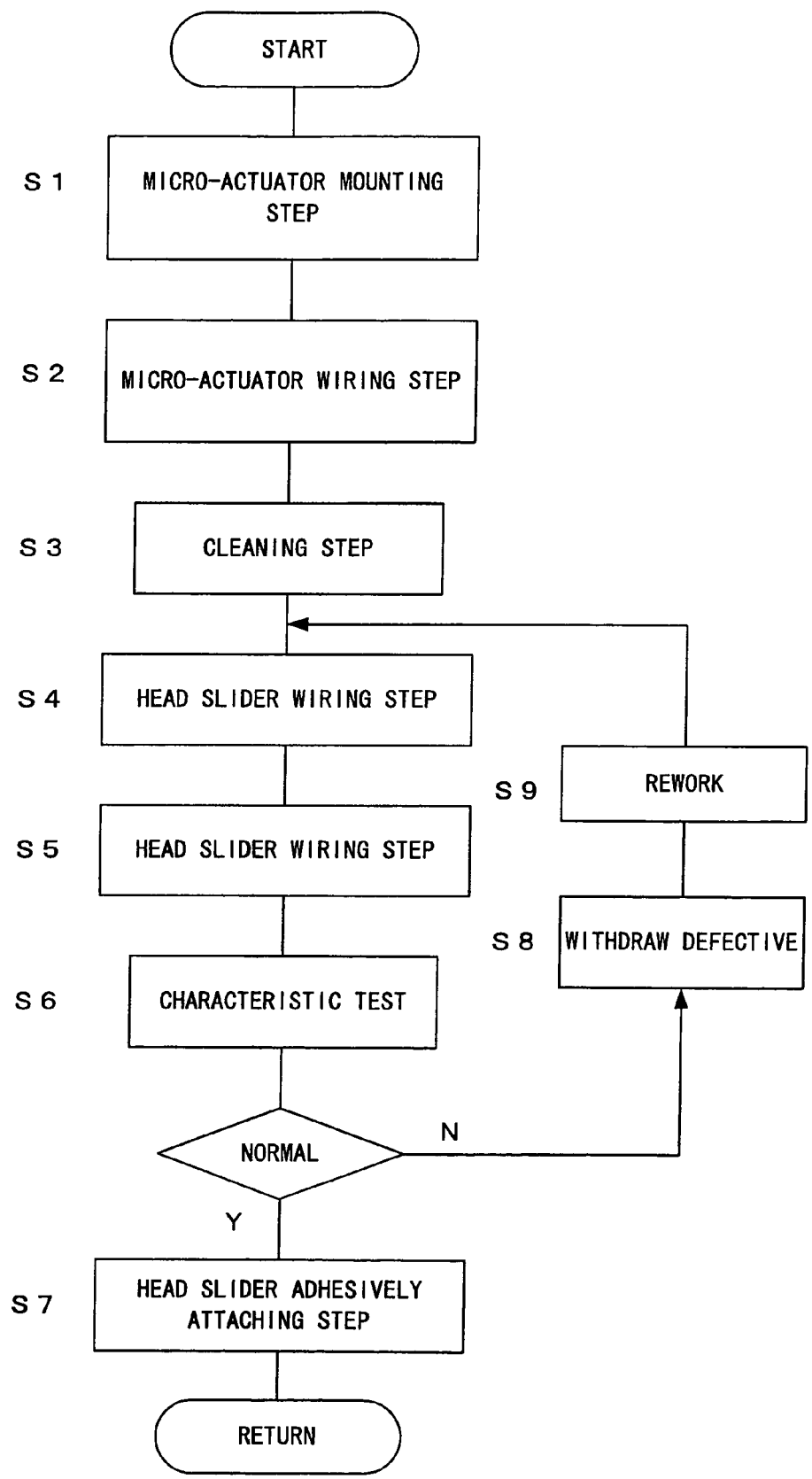
FIG. 8 is a flowchart showing the process of manufacturing the head gimbal assembly according to the embodiment of the present invention.
Figure 9:
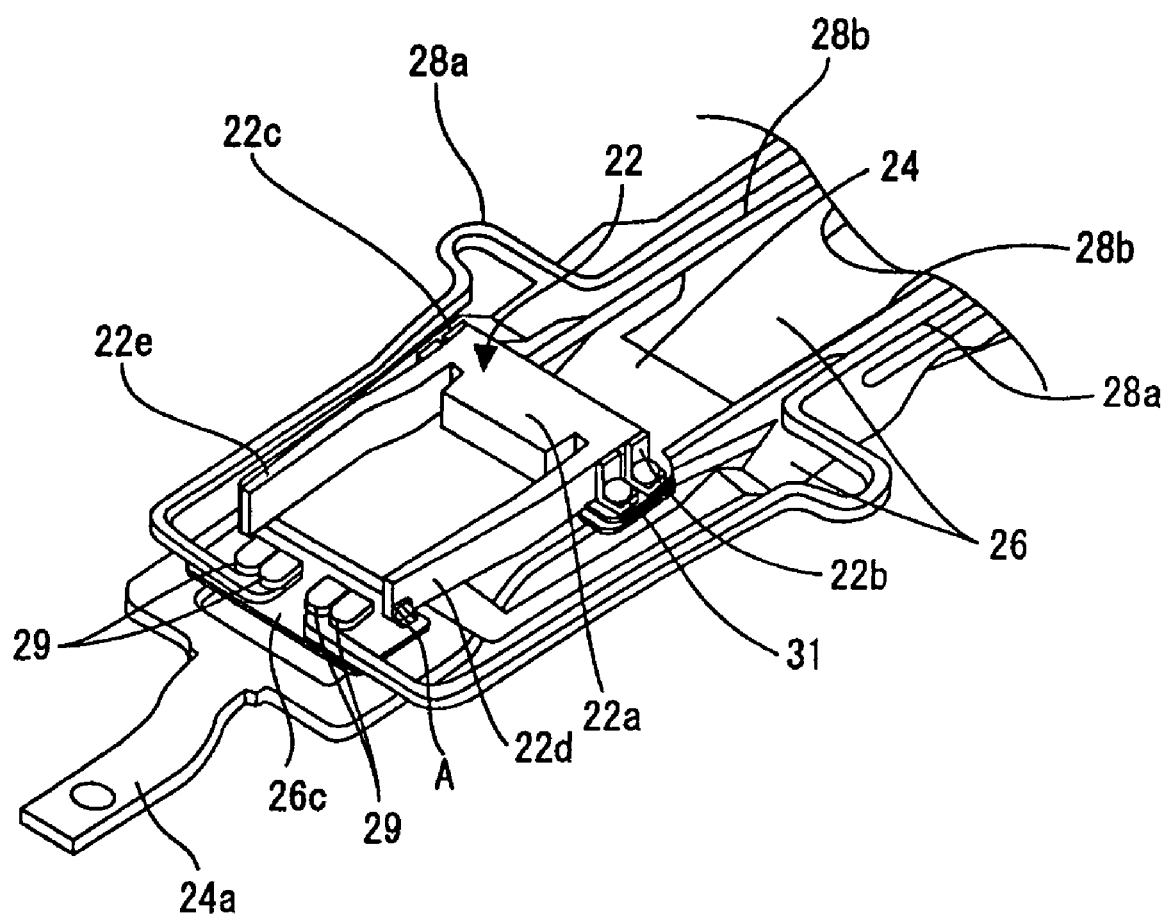
FIG. 9 is a perspective view showing a fabrication state in a micro-actuator mounting step.
Figure 10:
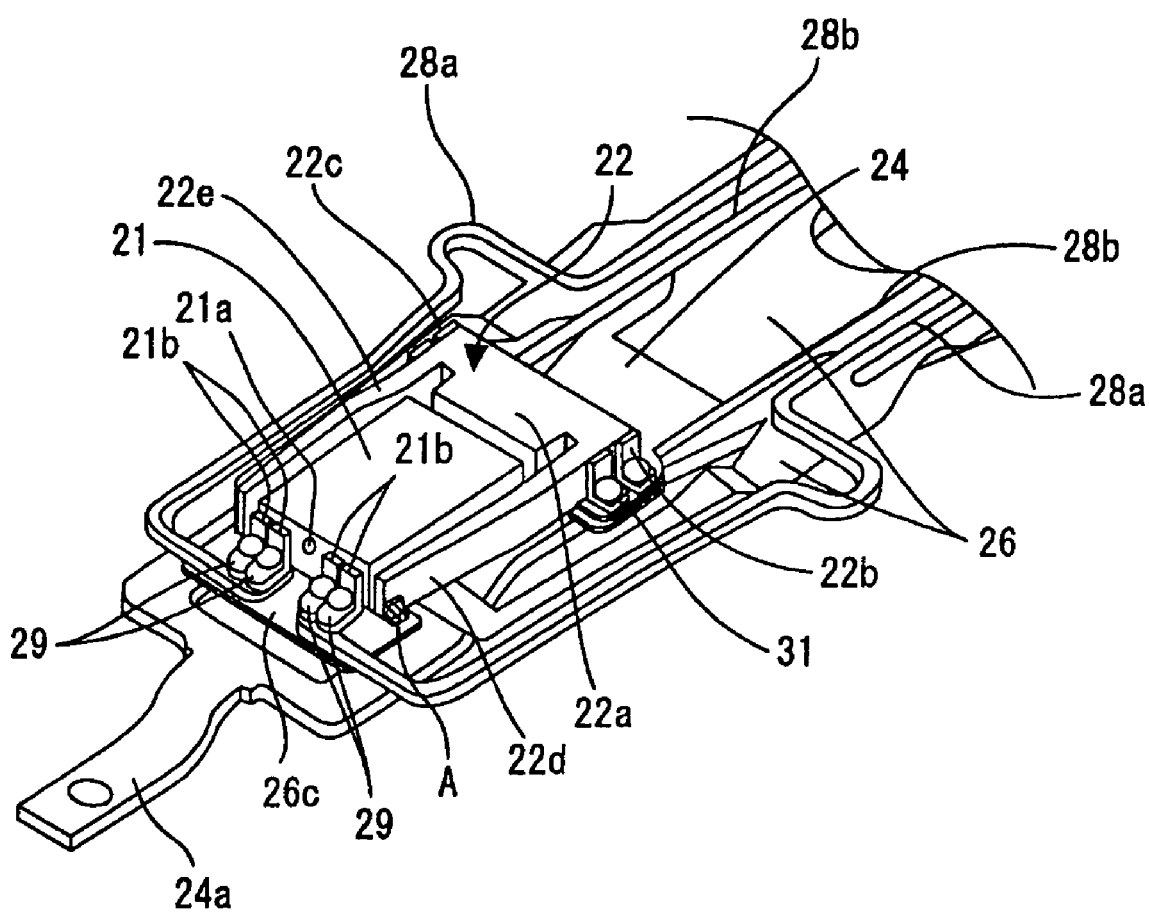
FIG. 10 is a perspective view showing the arrangement of the head slider and a fabrication state at the time point when the electrical connection step is finished.
Figure 11:
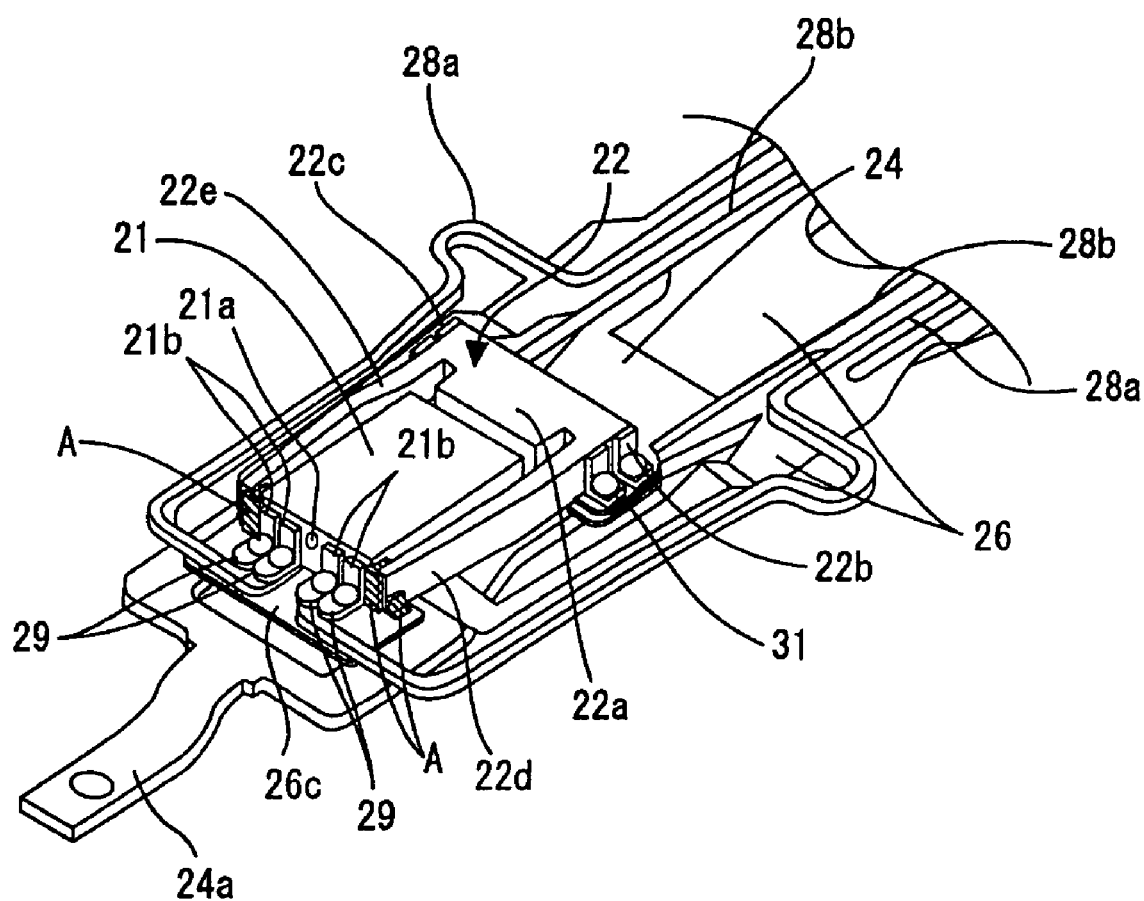
FIG. 11 is a perspective view showing a fabrication state in a head slider adhesively bonding step.

FIG. 8 is a flowchart showing the process of manufacturing the head gimbal assembly, and FIGS. 9 to 11 are perspective views showing the fabrication states in main manufacturing steps.

First, as shown in FIG. 9, the base portion 22a of the micro-actuator 22 is fixed to the tongue portion 26a (see FIG. 4) of the flexure 26 provided to the tip portion of the suspension 20 (S1: micro-actuator mounting step). At this time, the head slider 21 has not yet been adhesively bonded to the micro-actuator 22.

Here, the tip portions of the movable arm portions 22d, 22e of the micro-actuator 22 are adhesively bonded to the moving plate 26c by using the adhesive A. Accordingly, the moving plate 26c is fixed. Therefore, even when the head slider 21 is not adhesively bonded in the head slider electrical connection step (S5) described later, the characteristic test can be carried out by electrically connecting the terminal electrodes 21b to the magnetic head element connecting pads 29 on the moving plate 26c.

If the ground terminal is provided to the moving plate, electrically conductive adhesive such as silver paste or the like is used in place of the adhesive, and the movable arms 22d, 22e are adhesively bonded to the moving plate 26c through the electrically conductive adhesive so that the movable arms 22d, 22e are electrically conducted to the ground terminal, whereby the electrostatic charges accumulated in the micro-actuator can be discharged through the ground terminal. Therefore, this manner is effective to prevent ESD.

Next, the A-channel and B-channel signal terminal electrodes 22b, 22c provided to the base portion 22a of the micro-actuator are electrically connected to the actuator connecting pads 31 formed on the insulating layer 26b of the tongue portion 26a of the flexure 26 (S2: micro-actuator electrical connection step).

The above steps may be executed in a general clean room to which high precision is not required.

Thereafter, the process is shifted to a work to be executed in a high-precision clean room suitable for the handling of the head slider 21. In the high-precision clean room, the suspension 22 on which the micro-actuator 22 is mounted is first cleaned, and dust and moisture are substantially perfectly removed (S3: cleaning step).

Subsequently, as shown in FIG. 10, the head slider 21 is disposed between the movable arm portions 22d, 22e of the micro-actuator 22 mounted on the suspension 22 (S4: head slider arranging step), and the terminal electrodes 21b of the head slider 21 are electrically connected to the magnetic head element connecting pads 29 provided on the moving plate 26c (S5: head slider electrical connection step), whereby the electrical connecting work of the micro-actuator 22 and the head slider 21 is completed. Accordingly, the head gimbal assembly thus fabricated is allowed to be subjected to a characteristic test. At this time point, the head slider 21 has not yet been bonded to the micro-actuator by the adhesive.

Thereafter, a predetermined characteristic test is executed (S6). If the gimbal assembly is judged as being normal in the characteristic test, the movable arm portions 22d, 22e of the micro-actuator are bonded to the head slider 21 by adhesive A as shown in FIG. 11 (S7: head slider adhesively bonding step). The adhesion of these members is carried out by potting as described above. Through the above steps, the main fabricating process of the head gimbal assembly is completed.

On the other hand, if a defective of the head slider 21 of the head slider gimbal assembly thus fabricated is found in the characteristic test, the connection between the terminal electrodes 21b of the head slider 21 and the magnetic head element connecting pads 29 provided on the moving plate 26c is released, and the head slider 21 is removed from the gap between the movable arm portions 22d, 22e of the micro-actuator 22 (S8). In the manufacturing method of this embodiment, at the time point when the characteristic test is carried out, the head slider 21 has not yet been bonded to the micro-actuator d22 by the adhesive, and thus the work of removing and withdrawing the head slider 21 can be performed easily in short time.

It is unnecessary to detach the parts other than the head slider 21 (for example, the suspension 22 and the micro-actuator 22). Then, the process returns to the micro-actuator arranging step (S4) to arrange a new head slider 21 between the movable arms 22d, 22e of the micro-actuator, and then the electrical connecting work and the character test are successively carried out (S9: rework). As described above, the parts other than the head slider 21 can be used for the rework, and thus the parts can be saved and the workability of the rework can be enhanced.

The present invention is not limited to the above-described embodiment. For example, in the manufacturing method of the head gimbal assembly, steps other than the above-described steps may be inserted as occasion demands.

Figure 12:
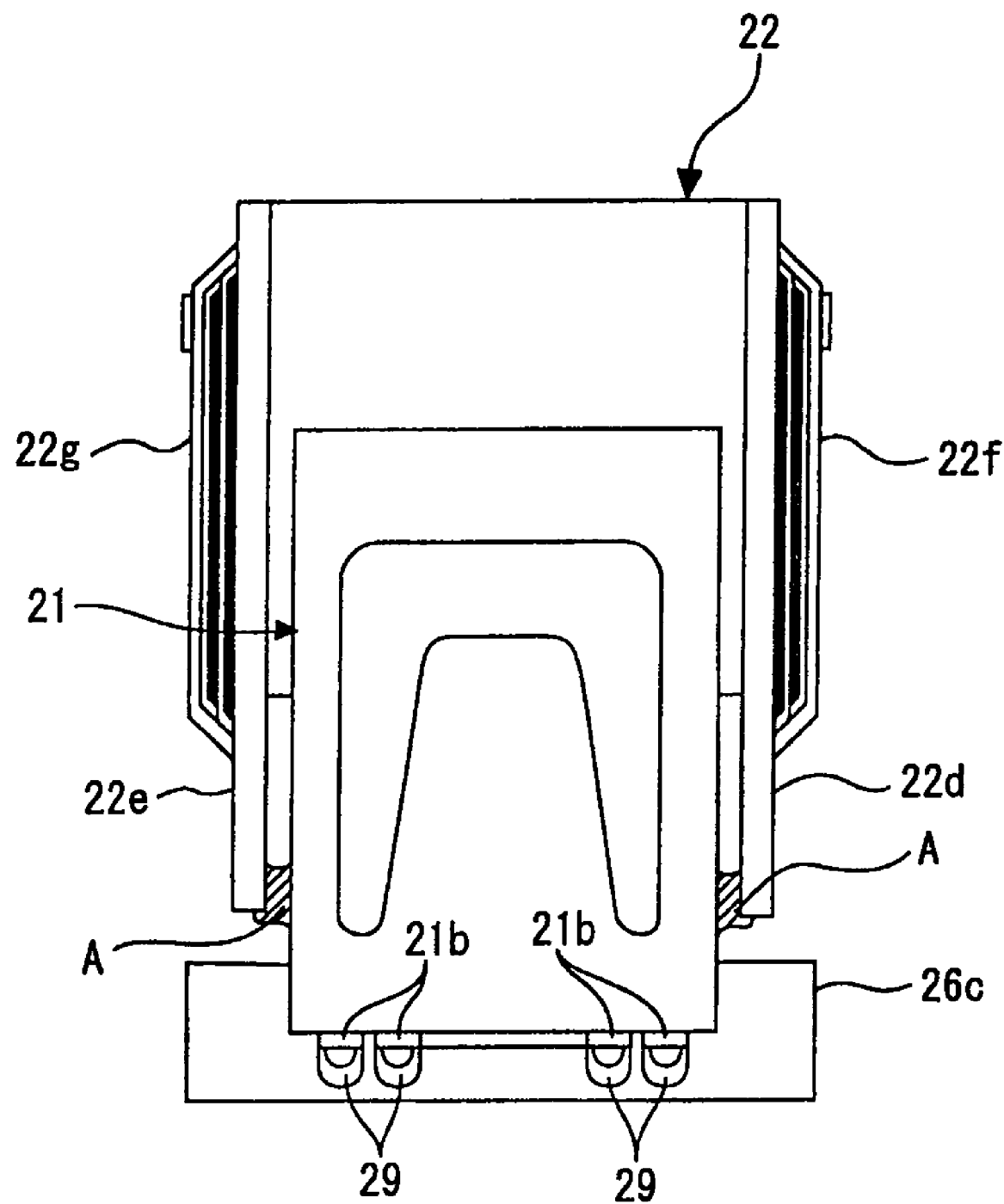
FIG. 12 is a plan view showing a construction example when the present invention is applied to a metal frame type micro-actuator.

Furthermore, the effects of the head gimbal assembly of the present invention and the magnetic disc drive device in which the head gimbal assembly is installed may be implemented by modifying the above-described structure shown in the figures without departing from the subject matter of the present invention. For example, the present invention may be applied to a head gimbal assembly in which a metal frame type micro-actuator 22 as shown in FIG. 12 is mounted. The metal frame type micro-actuator 22 is equipped with metal movable arm portions 22d, 22e, and the tip portions of the movable arm portions 22d and 22e are bonded to the side surface portion of the head slider 21 by the adhesive A. Here, the surfaces of the tip edge portions of the metal movable arm portions 22d, 22e are kept to be covered by the adhesive A.

What is claimed is:

1. A method of manufacturing a head gimbal assembly including a head slider having a magnetic head element, a micro-actuator for minutely driving the head element, the head slider being adhesively bonded to the micro-actuator, and a suspension on which the head slider and the micro-actuator are mounted, comprising:

mounting the micro-actuator on the suspension and fixing the micro-actuator to a tip portion of the suspension before the head slider is adhesively bonded to the micro-actuator, the suspension comprising a flexure to which the micro-actuator is adhesively bonded, and a moving plate which is supported independently of the flexure and on which an electrical connecting portion of the head slider is formed; and adhesively bonding the head slider to the micro-actuator mounted on the suspension with adhesive through which the head slider and an arm of the micro-actuator are adhered to each other, the adhesive expandable to the moving plate so that the moving plate is also adhesively bonded.

2. A method of manufacturing a head gimbal assembly including a head slider having a magnetic head element, a micro-actuator for minutely driving the head element, the head slider being adhesively bonded to the micro-actuator, and a suspension on which the head slider and the micro-actuator are mounted, comprising:

mounting the micro-actuator on the suspension and fixing the micro-actuator to a tip portion of the suspension before the head slider is adhesively bonded to the micro-actuator; and adhesively bonding the head slider to the micro-actuator mounted on the suspension, said adhesively bonding the head slider to the micro-actuator including adhesively bonding at least a part of the head slider and at least a tip portion of an arm of the micro-actuator to each other while covered by an adhesive, said adhesively bonding at least the part of the head slider and at least the tip portion of the arm of the micro-actuator resulting in the tip portion of the arm of the micro-actuator being covered by the adhesive, wherein said adhesive, through which the at least the part of the head slider and at least a tip edge portion of the arm of the micro-actuator are adhesively bonded, expands to and covers an electrical connecting portion of the head slider formed on the moving plate.

* * * * *